United States Patent
Tanaka et al.

(10) Patent No.: US 8,455,147 B2
(45) Date of Patent: Jun. 4, 2013

(54) HOOD INTERLOCK APPARATUS OF INDUSTRIAL VEHICLE

(75) Inventors: Hideyuki Tanaka, Aichi-ken (JP); Nobuo Watanabe, Susono (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 1278 days.

(21) Appl. No.: 12/286,953

(22) Filed: Oct. 2, 2008

(65) Prior Publication Data

US 2009/0110984 A1 Apr. 30, 2009

(30) Foreign Application Priority Data

Oct. 3, 2007 (JP) ................................. 2007-260160

(51) Int. Cl.
*H01M 8/06* (2006.01)

(52) U.S. Cl.
USPC ........... 429/427; 429/428; 429/429; 429/430; 429/431; 429/432; 429/443

(58) Field of Classification Search
USPC ................. 429/427, 428, 429, 430, 431, 432, 429/443
See application file for complete search history.

(56) References Cited

U.S. PATENT DOCUMENTS

| | | | | |
|---|---|---|---|---|
| 2002/0189873 A1* | 12/2002 | Mizuno | ........................ | 180/65.3 |
| 2004/0129466 A1* | 7/2004 | Leifert | .......................... | 180/65.2 |
| 2005/0032404 A1* | 2/2005 | Furuta et al. | ................... | 439/157 |
| 2007/0082265 A1* | 4/2007 | Itou et al. | ...................... | 429/223 |

FOREIGN PATENT DOCUMENTS

| | | |
|---|---|---|
| JP | H05-65701 U | 8/1993 |
| JP | 2002-367666 | 12/2002 |
| JP | 2004-349110 A | 12/2004 |
| JP | 2005-143200 | 6/2005 |
| JP | 2005-294215 | 10/2005 |
| JP | 2006-100480 | 4/2006 |
| JP | 2007-242434 A | 9/2007 |

OTHER PUBLICATIONS

Communication from counterpart Japanese Application No. 2007-26016 (dated Mar. 13, 2012).

* cited by examiner

*Primary Examiner* — Patrick Ryan
*Assistant Examiner* — Ben Lewis
(74) *Attorney, Agent, or Firm* — Locke Lord LLP

(57) ABSTRACT

A limit switch for detecting opening/closing of a hood is connected to a controller. A power supply relay is also connected to the controller. A switching contact of the relay is located on power supply line for supplying power supply from a fuel cell. When the hood is closed, the limit switch is on and the controller maintains the switching contact in a closed state so that power supply from the fuel cell to various power-consuming components is allowed. On the other hand, when the hood is opened, the limit switch is turned off. In response to this, the controller opens the switching contact so that the power supply from the fuel cell to the various power-consuming components is shut off.

4 Claims, 2 Drawing Sheets

HOOD INTERLOCK APPARATUS OF INDUSTRIAL VEHICLE

BACKGROUND OF THE INVENTION

1. Field of the Invention

The present invention relates to a hood interlock apparatus of an industrial vehicle, and more particularly, to a hood interlock apparatus equipped in an industrial vehicle containing a fuel cell unit including a fuel cell within an accommodation chamber provided with an openable hood.

2. Description of the Related Art

Recently, industrial vehicles such as fuel-cell type forklifts equipped with fuel cells as driving sources have been developed. In these industrial vehicles, a fuel cell unit may be constructed by assembling, for example, a fuel cell, components for operating the fuel cell, and components for cooling the fuel cell. The fuel cell unit may be located within an accommodation chamber formed below a driver's seat.

A hood is mounted in a manner making it freely openable at the top of the accommodation chamber so that maintenance operation for the components located within the accommodation chamber can be performed by opening the hood.

However, when the fuel cell is operating, the fuel cell in the fuel cell unit and the components to which power is supplied from the fuel cell can be at high voltage. Therefore, a structure for preventing contact with such high-voltage parts is required when the hood is open while the fuel cell is operating.

For example, Japanese Patent Application Laid Open No. 2005-143200 discloses an interlock apparatus for shutting off high voltage of an inverter. A cover is fixed to a case accommodating the inverter by means of a plurality of bolts and a sensor is mounted thereto for detecting opening/closing of the cover. The interlock apparatus shuts off power supply to the inverter when the sensor detects that the cover is open in order to shut off the high voltage. Japanese Patent Application Laid Open No. 2006-100480 and Japanese Patent Application Laid Open No. 2002-367666 also disclose related matters.

Contact with the high-voltage parts can be prevented, even if the hood is open while the fuel cell is operating, by applying the interlock apparatus as disclosed in the above Japanese Patent Application Laid Open No. 2005-143200. This can be achieved by providing a cover and a sensor or the like for detecting opening/closing of the cover to each component which may possibly have high voltage while the fuel cell is operating.

However, there has been a problem in that, if a cover and a sensor or the like for detecting opening/closing of the cover are provided to each component which may possibly have high voltage while the fuel cell is operating as described above, the number of components increases and the construction becomes complicated.

The present invention has been made to eliminate the above problem, and therefore an object of the present invention is to provide a hood interlock apparatus for industrial vehicles which can prevent contact with high-voltage parts when the hood is open, whilst having a simple structure.

SUMMARY OF THE INVENTION

A hood interlock apparatus for an industrial vehicle is installed in an industrial vehicle accommodating a fuel cell unit including a fuel cell within an accommodation chamber provided with an openable hood, comprising:

a switching contact located on a power supply line for supplying power from the fuel cell of the fuel cell unit;

an opening/closing detection apparatus for detecting opening/closing of the hood; and a controller which opens the switching contact, when the opening/closing detection apparatus detects that the hood is open, so that power supply from the fuel cell included in the fuel cell unit is shut off.

According to the present invention, whilst having a simple structure, contact with the high-voltage parts can be prevented.

DESCRIPTION OF THE PREFERRED EMBODIMENTS

Hereinafter, a description will be given of embodiments of the present invention with reference to the accompanying drawings.

First Embodiment

Figure 1:
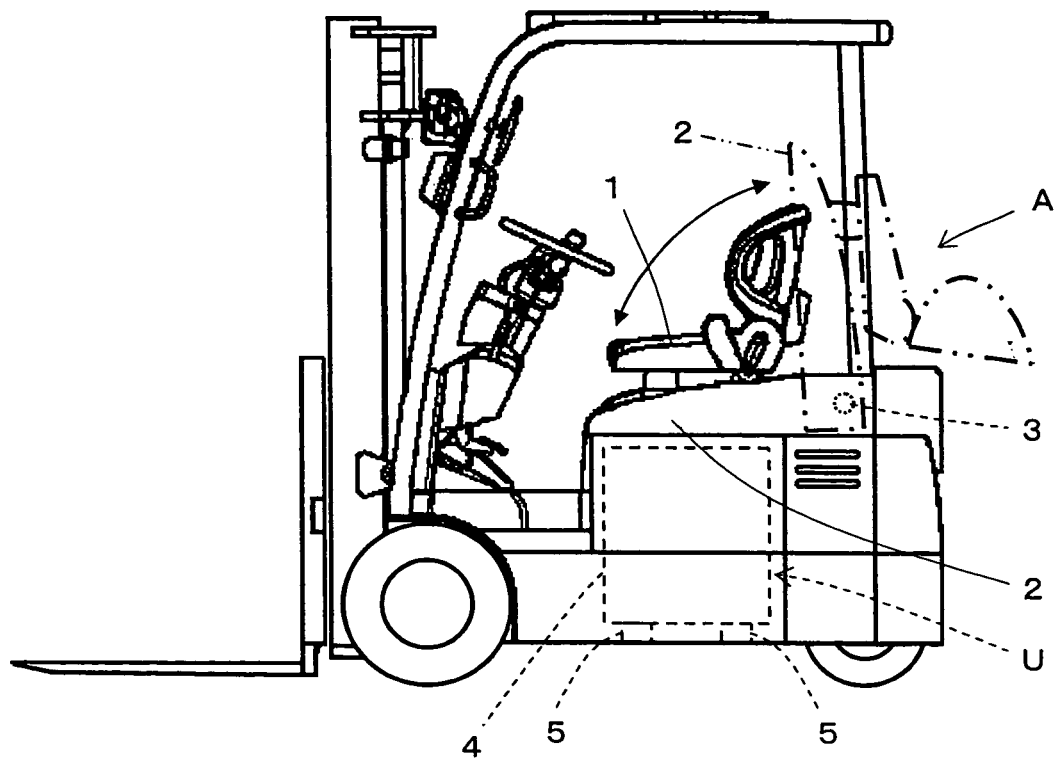
FIG. 1 is a diagram showing the construction of a fuel-cell type forklift equipped with a hood interlock apparatus according to a first embodiment of the present invention.

FIG. 1 shows the construction of a fuel-cell type forklift equipped with a hood interlock apparatus according to a first embodiment of the present invention. A fuel cell unit U, shown by dotted lines, is accommodated within an accommodation chamber formed below a driver's seat 1. A top portion of the accommodation chamber is closed by being covered with an openable hood 2. The driver's seat 1 is fixed to a top surface of the hood 2. The hood 2 and the driver's seat 1 are rotatable by means of a hinge (not shown) located at a rear end of the hood 2. Maintenance operation or the like for components accommodated within the accommodation chamber can be performed by rotating and opening the hood 2 together with the driver's seat 1 to reach an open position A shown by two-dot chain lines. Further, a limit switch 3 is mounted to the hinge of the hood 2 as an opening/closing detection apparatus for detecting opening/closing of the hood 2.

The fuel cell unit U has a box-like casing body 4. A fuel cell (explained hereafter) which functions as a driving source for the forklift is accommodated within the casing body 4. Also, although not shown in the figure, components for operating the fuel cell, e.g. a hydrogen tank, a regulator for supplying hydrogen, an air compressor, a humidifier, a capacitor, a battery, etc., are accommodated within the casing body 4. Further, components for cooling the fuel cell, e.g. a cooling water circulation pump, a radiator, a fan, a fan motor, etc., are also accommodated within the casing body 4.

Figure 2:
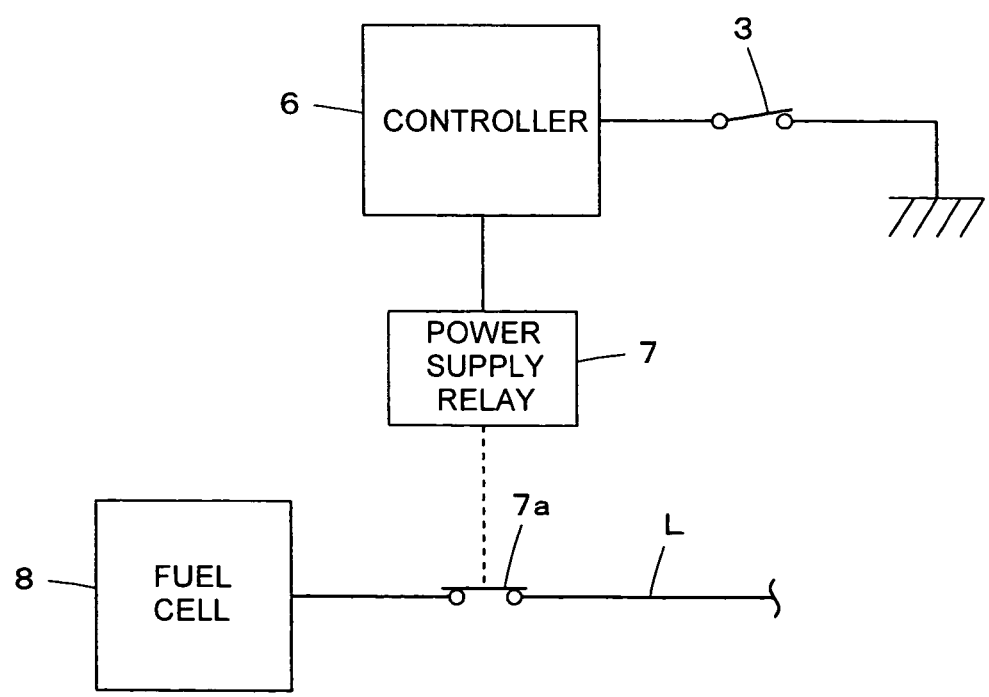
FIG. 2 is a block diagram showing the hood interlock apparatus when the hood is closed according to the first embodiment.

As shown in FIG. 2, the hood interlock apparatus has a controller 6. Connected to the controller 6 is an end portion of the limit switch 3 which detects opening/closing of the hood 2. The other end portion of the limit switch 3 is grounded. Also, power supply relay 7 is connected to the controller 6.

Fuel cell 8 of the fuel cell unit U is connected to various power-consuming components (not shown), e.g. a driving motor for the vehicle, a load motor, a power-steering apparatus, an air compressor, an air conditioning apparatus, etc., via power supply line L. Switching contact 7a of the power supply relay 7 is located on the power supply line L.

Next, an operation of the hood interlock apparatus according to the first embodiment is described below. When the hood 2 is closed, the limit switch 3 is on and the controller 6 maintains the switching contact 7a of the power supply relay 7 in a closed state so that power supply from the fuel cell 8 to the various power-consuming components is allowed.

Figure 3:
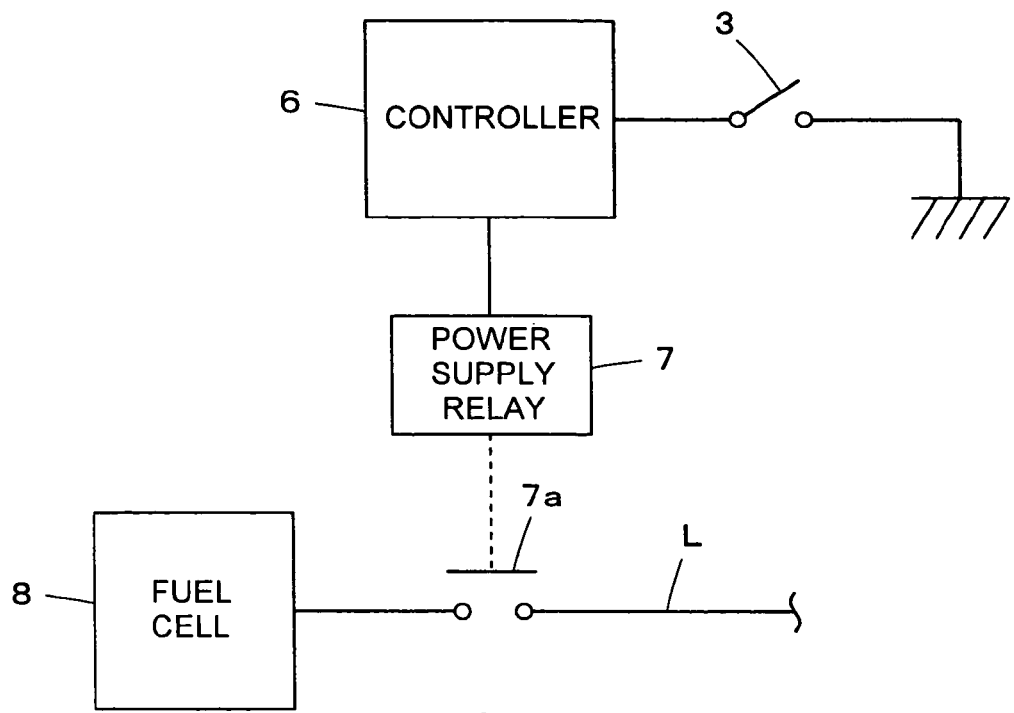
FIG. 3 is a block diagram showing the hood interlock apparatus when the hood is open according to the first embodiment.

On the other hand, when the hood 2 is opened by being rotated toward the open position A together with the driver's seat 1, the limit switch 3 is turned off as shown in FIG. 3. In response to this, the controller 6 opens the switching contact 7a of the power supply relay 7 so that the power supply from the fuel cell 8 to the various power-consuming components is shut off.

In this manner, when the hood 2 is open, the power supply from the fuel cell 8 to the various power-consuming components is shut off so that high voltage is avoided in electrodes of the fuel cell 8 and in the various power-consuming components. Therefore, contact with the high-voltage parts within the accommodation chamber is prevented even if the hood 2 is opened while the fuel cell 8 is operating. As a result, maintenance operation such as supplying cooling water to a radiator of the fuel cell unit U or exchanging filters of an air cleaner can be performed safely.

Accordingly, it is not necessary to provide a cover and a sensor or the like for detecting opening/closing of the cover for each component which may possibly have high voltage when the fuel cell 8 is operating. Thus, a hood interlock apparatus which is small and simply constructed but ensures high safety can be realized.

Second Embodiment

Next, a hood interlock apparatus according to a second embodiment of the present invention is explained with reference to FIG. 4. The hood interlock apparatus according to the second embodiment not only shuts off the power supply from the fuel cell 8 but also shuts off hydrogen supply to the fuel cell 8 when the hood 2 is opened. That is, supply pipe 10 is connected to the fuel cell 8 for supplying hydrogen from hydrogen tank 9 and a valve 11 is located along the supply pipe 10. The valve 11 is electrically connected to the controller 6.

When the hood 2 is closed, the limit switch 3 is on and the controller 6 maintains the switching contact 7a of the power supply relay 7 in a closed state and maintains the valve 11 of the supply pipe 10 in an open state. By doing so, the controller 6 allows hydrogen supply to the fuel cell 8 and power supply from the fuel cell 8 to the various power-consuming components.

Figure 4:
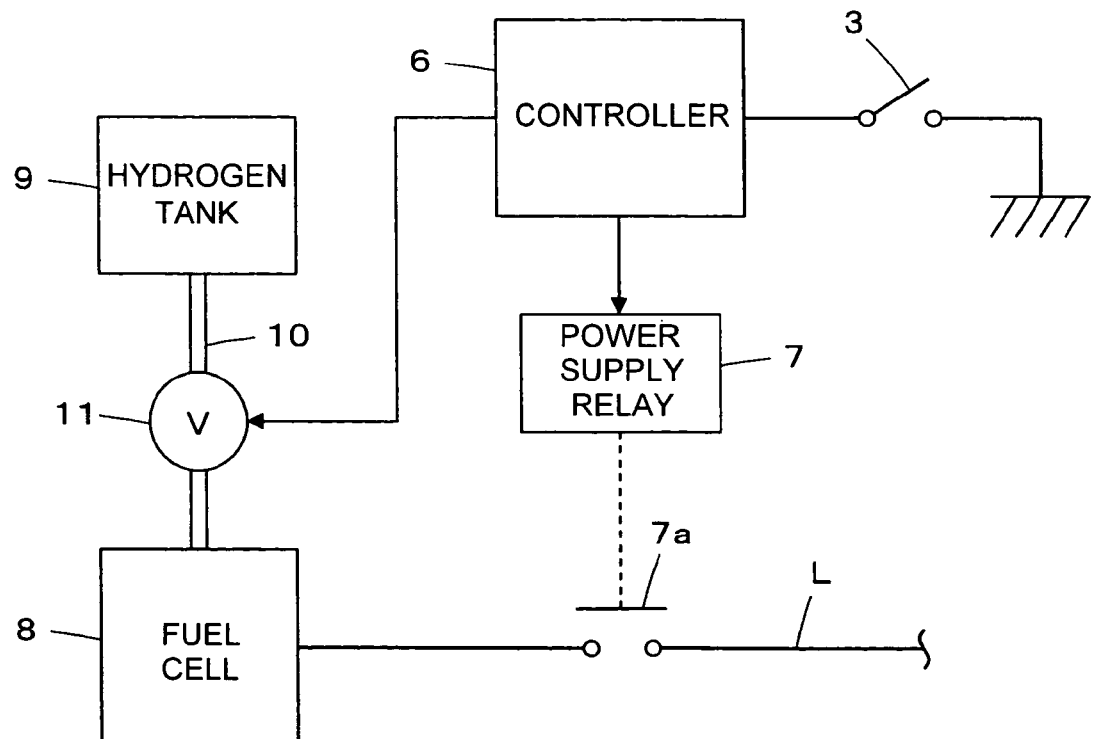
FIG. 4 is a block diagram showing the hood interlock apparatus when the hood is open according to a second embodiment.

On the other hand, when the hood 2 is opened by being rotated toward the open position A together with the driver's seat 1, the limit switch 3 is turned off as shown in FIG. 4. In response to this, the controller 6 opens the switching contact 7a of the power supply relay 7 so that the power supply from the fuel cell 8 to the various power-consuming components is shut off, and at the same time the controller 6 also closes the valve 11 so that the hydrogen supply to the fuel cell 8 is shut off.

In this manner, when the hood 2 is open, high voltage is avoided in the fuel cell 8 and in the various power-consuming components. Therefore, in a manner similar to that of the above-described first embodiment, contact with the high-voltage parts within the accommodation chamber is prevented even if the hood 2 is opened while the fuel cell 8 is operating.

In addition, in the second embodiment, the hydrogen supply to the fuel cell 8 is also shut off when the hood 2 is opened. Therefore, the fuel cell 8 becomes unable to generate electrical power, and even in the case of opening the hood 2 due to some trouble of the fuel cell, emission of highly concentrated hydrogen is prevented. Thus, safety is further enhanced.

In the first and second embodiments described above, the limit switch 3 is mounted to the hinge of the hood 2. As alternative constructions, an opening/closing detection apparatus such as a limit switch may be mounted to a lock member of the hood 2, a damper of the hood 2, or the hood 2 itself, in order to detect opening/closing of the hood 2.

It should be noted that the hood interlock apparatus according to the present invention can be applied not only to forklifts but also to various industrial vehicles mounted with a fuel cell unit U as a driving source including a fuel cell within an accommodation chamber provided with an openable hood.

What is claimed is:

1. A hood interlock apparatus installed in an industrial vehicle accommodating a fuel cell unit including a fuel cell within an accommodation chamber provided with an openable hood, comprising:
   a switching contact located on a power supply line for supplying power from the fuel cell of the fuel cell unit;
   a valve mounted to a supply pipe for supplying hydrogen to the fuel cell;
   an opening/closing detection apparatus for detecting opening/closing of the hood; and
   a controller which opens the switching contact, when the opening/closing detection apparatus detects that the hood is open, so that power supply from the fuel cell included in the fuel cell unit is shut off; wherein a controller closes the valve, when the opening/closing detection apparatus detects that the hood is open, so that hydrogen supply to the fuel cell is shut off.

2. The hood interlock apparatus according to claim 1, wherein:
   a valve is mounted to a supply pipe for supplying hydrogen to the fuel cell; and
   the controller closes the valve, when the opening/closing detection apparatus detects that the hood is open, so that hydrogen supply to the fuel cell is shut off.

3. The hood interlock apparatus according to claim 1, wherein the accommodation chamber includes a part which has high voltage when the fuel cell is operating.

4. The hood interlock apparatus according to claim 1, wherein a driver's seat is fixed to a top surface of the hood.

* * * * *